US011192651B2

(12) United States Patent
Ehlers et al.

(10) Patent No.: US 11,192,651 B2
(45) Date of Patent: Dec. 7, 2021

(54) GROUP OF SEATS FOR A PASSENGER AIRCRAFT

(71) Applicant: Airbus Operations GmbH, Hamburg (DE)

(72) Inventors: Bernd Ehlers, Hamburg (DE); Stefan Behrens, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 330 days.

(21) Appl. No.: 16/226,008

(22) Filed: Dec. 19, 2018

(65) Prior Publication Data
US 2019/0193860 A1 Jun. 27, 2019

(30) Foreign Application Priority Data

Dec. 22, 2017 (DE) .......................... 102017131057.6

(51) Int. Cl.
 *B64D 11/06* (2006.01)
(52) U.S. Cl.
 CPC ........ *B64D 11/0601* (2014.12); *B64D 11/064* (2014.12)
(58) Field of Classification Search
 CPC .............. B64D 11/0601; B64D 11/064; B64D 11/0639; B64D 11/0696
 See application file for complete search history.

(56) References Cited

U.S. PATENT DOCUMENTS

| 3,394,964 | A | * | 7/1968 | Humphries | ........ B61D 33/0085 |
| | | | | | 297/240 |
| 3,822,852 | A | * | 7/1974 | Quakenbush | .......... B60N 2/143 |
| | | | | | 248/418 |
| 5,302,065 | A | | 4/1994 | Vogg et al. | |
| 6,000,659 | A | | 12/1999 | Brauer | |
| 6,149,118 | A | | 11/2000 | Ruff | |
| 6,302,483 | B1 | * | 10/2001 | Ricaud | ............... B61D 33/0085 |
| | | | | | 297/344.22 |

(Continued)

FOREIGN PATENT DOCUMENTS

| DE | 1530040 B1 | 1/1970 |
| DE | 4212694 C2 | 10/1993 |

(Continued)

OTHER PUBLICATIONS

German Search Report; priority document.

*Primary Examiner* — Christopher D Hutchens
(74) *Attorney, Agent, or Firm* — Greer, Burns & Crain, Ltd.

(57) ABSTRACT

A group of seats for a passenger aircraft, which is configured as a rotating group of seats and by rotating the group of seats about the rotation axis a relocation of the position of the group of seats in relation to the initial position in the aircraft cabin is simultaneously achieved. The group of seats has a seat frame and at least one seat element. A support plate for fastening the group of seats to the aircraft structure is furthermore provided, the support plate having a rotating element which rotatably connects the support plate and the aircraft structure, the rotation axis of the rotating element being positioned in the region of the front half of the seat element, wherein the support plate is capable of being fastened to the aircraft structure by way of quick-release locks.

11 Claims, 3 Drawing Sheets

(56) References Cited

U.S. PATENT DOCUMENTS

| | | | | |
|---|---|---|---|---|
| 6,981,746 B2* | 1/2006 | Chung | ................... | B60N 2/245 |
| | | | | 297/344.21 |
| 8,870,116 B2* | 10/2014 | Boren | ................... | B64D 11/00 |
| | | | | 244/118.6 |
| 8,998,326 B2* | 4/2015 | DeCraene | ................ | B60N 2/14 |
| | | | | 297/344.24 |
| 9,285,580 B2 | 3/2016 | Lin et al. | | |
| 2005/0087650 A1* | 4/2005 | Quan | ................ | B64D 11/0601 |
| | | | | 244/118.6 |
| 2005/0179302 A1 | 8/2005 | Chung et al. | | |
| 2006/0108848 A1* | 5/2006 | Williamson | ........... | B60N 2/062 |
| | | | | 297/344.24 |
| 2011/0068226 A1* | 3/2011 | Baatz | ................ | B64D 11/0696 |
| | | | | 244/118.6 |
| 2015/0145300 A1* | 5/2015 | Finlay | ................ | B64D 11/0696 |
| | | | | 297/257 |
| 2016/0244170 A1* | 8/2016 | Marini | ............... | B64D 11/0648 |

FOREIGN PATENT DOCUMENTS

| | | |
|---|---|---|
| DE | 202006010700 U1 | 9/2006 |
| DE | 102006029206 A1 | 1/2008 |
| DE | 102013103607 A1 | 11/2013 |
| DE | 102013227013 A1 | 6/2015 |
| EP | 0850834 A1 | 7/1998 |
| WO | 2004083013 A2 | 9/2004 |

* cited by examiner

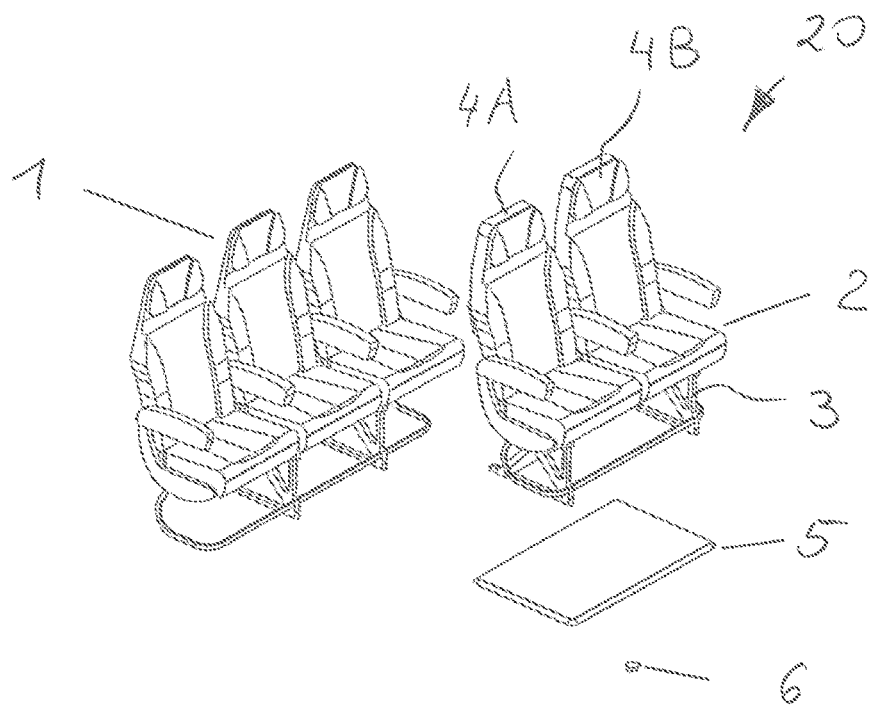
Fig. 1
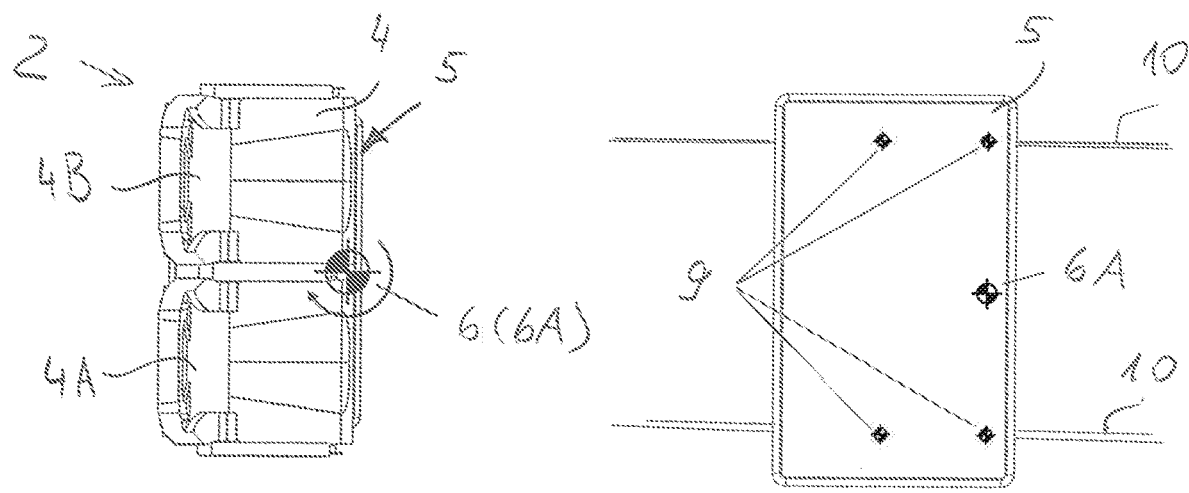
Fig. 2
Fig. 3

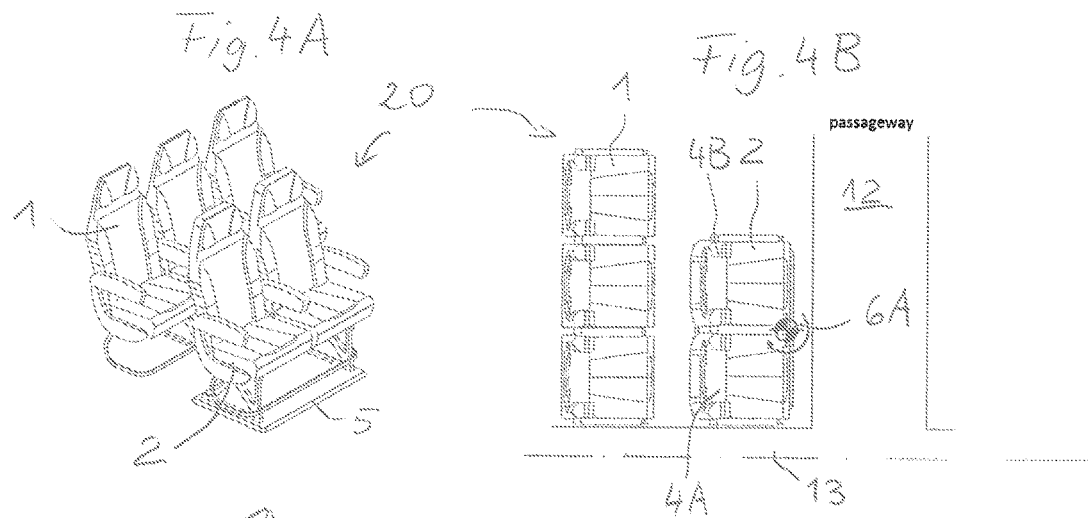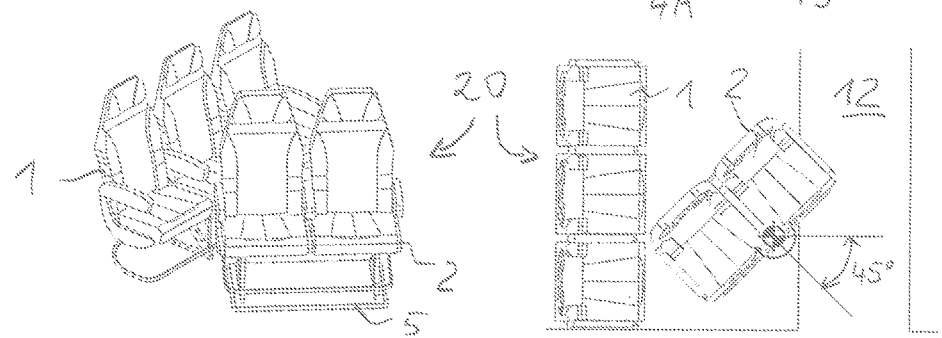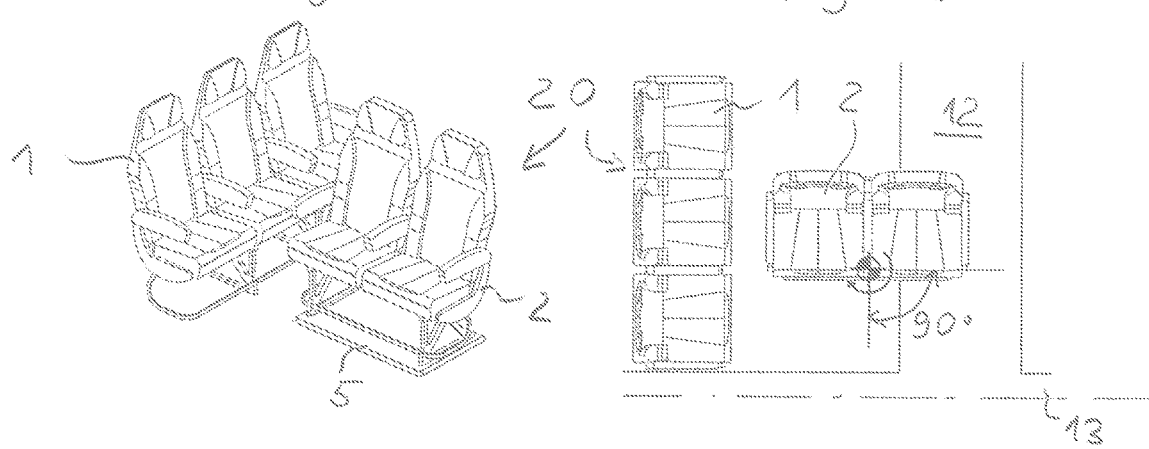

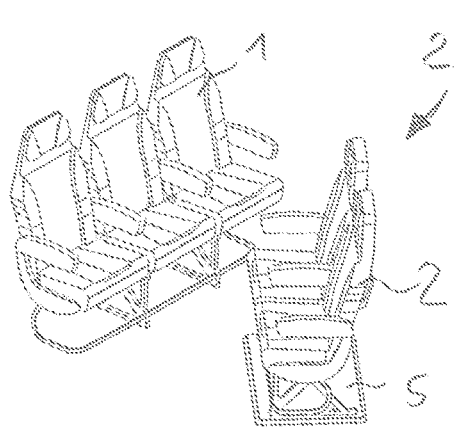
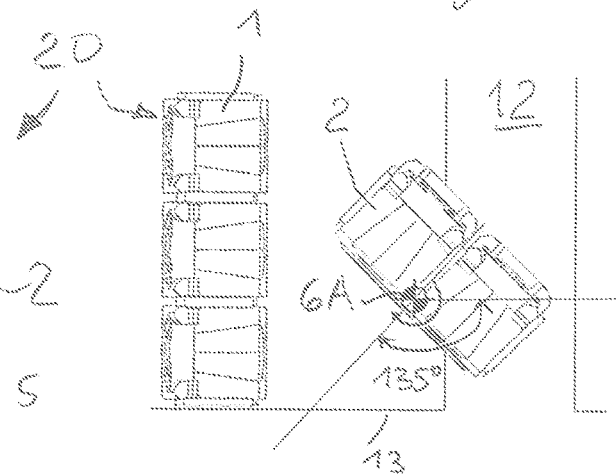
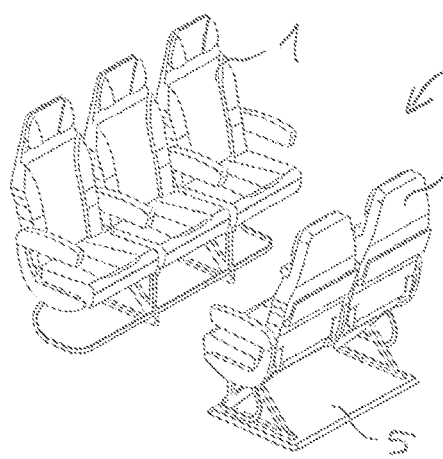
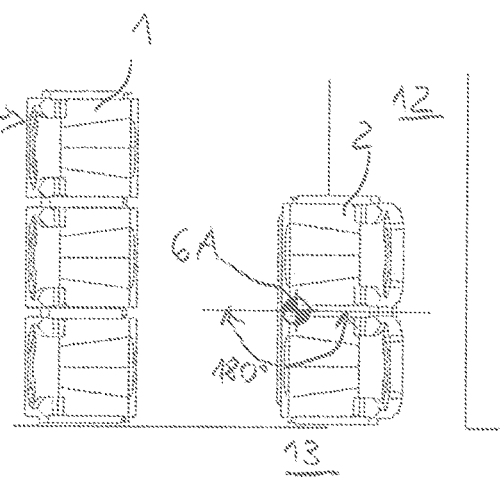
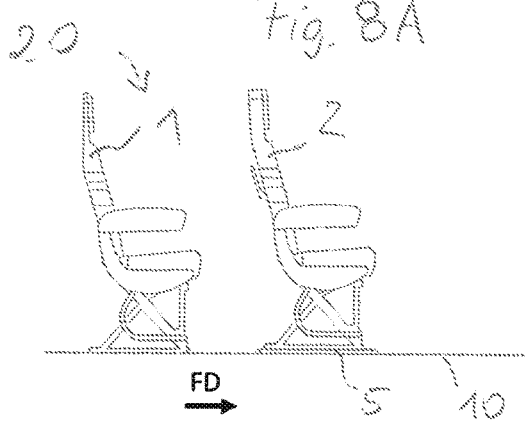
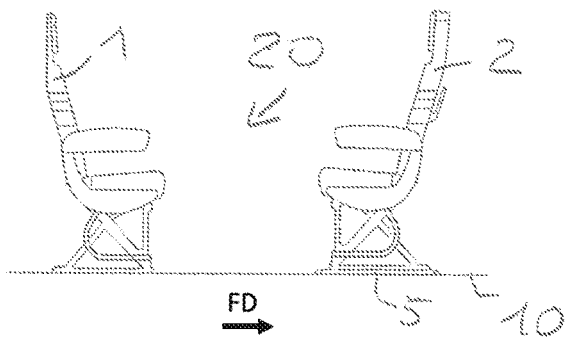

GROUP OF SEATS FOR A PASSENGER AIRCRAFT

CROSS-REFERENCES TO RELATED APPLICATIONS

This application claims the benefit of the German patent application No. 10 2017 131 057.6 filed on Dec. 22, 2017, the entire disclosures of which are incorporated herein by way of reference.

FIELD OF THE INVENTION

The invention relates to a group of seats for a passenger aircraft.

BACKGROUND OF THE INVENTION

Air passenger seats for passenger aircraft are known in the most varied of embodiments. One important aspect in the construction of air passenger seats in the case of a predefined seat arrangement in an aircraft cabin is to provide the air passenger with a large space for movement. Seat rows having benches inter alia in triple or twin benches are thus usually known. Individual seats are also known, in particular for applications in business class or first class. The seats are usually fastened in seat rails of a passenger aircraft.

The typical orientation of an aircraft seat is the arrangement aligned in the direction of flight. It is thus ensured that the high safety requirements for an aircraft seat can be met during the boarding and alighting procedure, as well as the take-off and landing phase, while adhering to an optimized seat spacing. However, there are also requirements for designing seating areas in a flexible manner and for implementing an optimized use of the available space in a passenger cabin.

For example, it is known from 102013103607 A1 to modify the seat spacings in a flexible manner in the case of seat rows disposed behind one another and to displace and store seats that are not required by having the seat face folded away. Other seat rows can thus be likewise displaced on the seat rail, and more space can be made available to the passengers by enlarging the seat spacing.

EP 0 850 834 A1 shows seat arrangements for a business class or first class in passenger aircraft, the seat arrangements in the daytime position having seats or seat benches, respectively, that are aligned in the direction of flight, and in a position rotated by 90° enables a lying position (as a night-time position) that is converted to a bed. The seat bench is equipped with a rotatable subframe therefor. Apart from rotating the double seat, it is furthermore provided for the subframe to be displaced in the direction of the aircraft center aisle and to thus achieve a lying position at 90° to the direction of flight. The adjustment to the "night-time position" is performed by rotating the seat while utilizing the aircraft longitudinal aisle, and enables a completely horizontal lying surface, wherein the aisle area is almost completely utilized.

A flexible utilization of the passenger space adapted to the needs of the air passenger is enabled in both solutions shown. In order for the comfort to be improved, further flexible seat arrangements are to be proposed which offer the airlines the possibility to react to different customer requirements and to enable a flexible adaptation of the passenger cabin to the requirements on different air routes without the loss of seating capacity.

SUMMARY OF THE INVENTION

It is an object of the present invention to provide a group of passenger seats which meets the flexible requirements of use in a commercial aircraft.

The object is achieved, according to one exemplary embodiment of the present invention, in which a group of seats for a passenger aircraft is provided, wherein the group of seats has a seat frame and at least one seat element, as well as a support plate for fastening the group of seats to the aircraft structure. A rotating element which rotatably connects the support plate and the aircraft structure, the rotation axis of the rotating element being positioned in the region of the front half of the seat element. The group of seats is thus configured as a rotating group of seats and a relocation of the position of the group of seats in relation to the position in the aircraft cabin is simultaneously achieved by rotating about the rotation axis.

The support plate is capable of being fastened to the aircraft structure by way of quick-release locks. Quick-release locks for fastening to the aircraft floor are known from a diversity of arrangements and can be selected or developed, respectively, by skilled action.

The rotating element having the rotation axis can be disposed on the support plate so as to be symmetrical in the y-direction (in the direction of the aircraft transverse aisle) and thus avoid a relocation of the group of seats in the y-direction. When a positioning of the group of seats by way of an offset in the y-direction is to arise, the rotation axis in this instance has to likewise be positioned outside the axis of symmetry on the support plate.

In order for commercially available groups of seats to be able to be adapted to the group of seats according to the invention, the seat frame is fixed to the support plate by way of seat fittings. Various types of groups of seats, for example also products by different manufacturers, can thus be adapted to the support plate.

Alternative thereto, the support plate and the seat frame can be an integral component which is optimized in terms of weight and which receives the rotating element.

Two seat elements are preferably disposed on the seat frame. Alternative embodiments having one seat element or else a seat bench are possible.

The rotation axis of the rotating element in the region of the front edge of the seat elements is aligned in the x-direction. More specifically, the position of the rotation axis in the front half of the seat element is preferably aligned so as to be perpendicular to the front edge.

In one preferred embodiment the rotating element is formed having a rotating pin which is disposed on the support plate and which engages in a bearing receptacle on the aircraft structure.

The group of seats according to the invention by means of the support plate is capable of being fixed in seat rails of the passenger aircraft by way of quick-release lock fittings.

Furthermore, a seat arrangement according to the invention is provided in the passenger cabin of a commercial aircraft, which is equipped with at least two group of seats which are disposed behind one another and which are dispose beside an aircraft longitudinal aisle, wherein the front group of seats is disposed in the region of an aircraft transverse aisle, and the front group of seats is configured as a rotating group of seats.

The seat arrangement having the two groups of seats has groups of seats which are disposed behind one another at a spacing of 28 to 32 inches (from seat reference point to seat reference point). The rotating group of seats in the take-off and landing state is aligned in the direction of flight. The seat reference point (SRP) for aircraft seats and methods for determining the seat reference point are established in standards. Methods for determining the seat reference point (SEP reference point—SRP) for aircraft seats were originally included in AS8049 and are henceforth governed by ARP5526. The SRP is a feature of the seat which is used for aircraft seats in a plurality of SAE documents as well as in standards and directives. The SAE is a global association of engineers and technical experts in the aviation, automotive and commercial vehicle industry.

The rotating group of seats in the flying state is aligned in a rotated position counter to the direction of flight and rotated by 180° in a face-to-face position with the rear group of seats. The rear group of seats in the position is disposed at a spacing of at least 45 inches between the seat reference point of the rear group of seats and the seat reference point of the front group of seats.

In order for a spaced-optimized seat arrangement to be achieved, the rear group of seats is to be disposed at a spacing of 53 inches, corresponding to approximately 1346 mm, between the seat reference points to the front group of seats. This is an appropriate spacing for specific categories of persons, in particular in the European region. Shorter spacings are conceivable, for example for persons from the Asian region. An arrangement of the two groups of seats in the face-to-face position can thus be specified as being in a range of at least 45 inches between the seat reference points.

An aircraft passenger cabin of a commercial aircraft having an advantageous seat arrangement according to the invention is likewise specified.

Further advantageous embodiments and refinements are to be derived from the description hereunder.

BRIEF DESCRIPTION OF THE DRAWINGS

Preferred exemplary embodiments of the present invention are described hereunder with reference to the figures. The same reference signs are used for the same or similar elements.

The illustrations in the figures are schematic and not to scale. In the figures:

FIG. 1 shows a perspective illustration of a passenger seat arrangement;

FIG. 2 shows the rotating group of seats according to the invention, in a view from above;

FIG. 3 shows the support plate as a component part of the rotating group of seats according to the invention, in a view from above;

FIGS. 4A and 4B show the passenger seat arrangement according to the invention in the normal position for take-off and landing, in a perspective illustration and in a view from above;

FIGS. 5A, 5B and 6A, 6B and 7A, 7B show the passenger seat arrangement according to the invention in various intermediate positions, in a perspective illustration and in a view from above;

FIGS. 8A and 8B show the passenger seat arrangement according to the invention in the rotated position for the use during the flight, in a perspective illustration and in a view from above;

FIG. 9 shows the passenger seat arrangement in the normal position having groups of seats aligned in the direction of flight, in a side view; and FIG. 10 shows the passenger seat arrangement in a rotated position (face-to-face position) having the rotating group of seats rotated by 180°, in a side view.

DETAILED DESCRIPTION OF THE PREFERRED EMBODIMENTS

A seat arrangement 20 in the passenger cabin of a commercial aircraft, having at least two groups of seats 1 and 2 disposed behind one another is shown in FIG. 1. The rear group of seats 1 is configured as a three-seat bench, as is usually used in passenger aircraft in cabin layouts for an economy class. The rear group of seats 1 is disposed at least at a minimum spacing of 28 inches (based on the respective seat reference point—SRP) from the front group of seats 2. The seat reference point (SRP) for aircraft seats and methods for determining the seat reference point are established in standards. Methods for determining the seat reference point (SEP reference point—SRP) for aircraft seats were originally included in AS8049 and are now explained in ARP5526. The seats spacings between the seat rows 1, 2 in the economy class are usually 28 to 32 inches. The front group of seats 2 according to the invention is configured as a rotating group of seats. The rotating group of seats is advantageously configured as a group of two seats. The rotating group of seats, as an alternative embodiment, can also be configured as a single seat or as a seat bench. In the configuration as a group of two seats 2, the rotating group of seats is composed of a seat frame 3 and two seat elements 4A, 4B disposed thereon. The seat frame 3 is fastened to a support plate 5 which, in turn, is capable of being fastened to the aircraft structure by way of releasable fittings. In order for a rotation of the front group of seats 2 to be enabled, a rotating element 6 which rotatably connects the support plate 5 to the aircraft structure is provided. The rotating element 6 can be configured as a rotating pin which is mounted in a receptacle 7 for the rotating element 6 in the floor region of the aircraft.

A view from above onto the rotating group of seats 2 is shown in FIG. 2. It can be seen that the front edge of the support plate 5 is aligned in the region of the front edge of the seat elements 4. The rotation axis 6A is thus disposed in the front region of the support plate 5 and in the front region of the seat element 4, inevitably in the front half of the seat element 4. The rotation axis 6A is preferably aligned so as to be perpendicular to the front edge of the seat elements 4. The rotating element 6 is positioned below the support plate 5. The position of the rotating element 6 and the rotation axis 6A thereof can be seen in a schematic illustration. The position of the rotation axis 6A in the x-alignment (x-position), that is to say, that the group of seats 2 in the installed state in the aircraft passenger cabin is aligned in the aircraft longitudinal direction 13, lies in the region of the front edge of the support plate 5 and in the embodiment shown is thus in the region of the front edge of the seat element 4. This means that a relocation of the entire front group of seats 2 in the x-direction in relation to the reference of the rear group of seats 3 is achieved by a rotation of the group of seats 2 by way of the support plate 5. A passenger seat arrangement 20 of this type will yet be described in detail in the figures hereunder. The position of the rotating element 6 on the support plate 5 in the y-direction, that is to say, transversely to the aircraft longitudinal aisle 13, in the preferred design embodiment shown is performed in a symmetrical manner. This means that the rotating element 6 by way of the rotation axis 6A thereof is disposed so as to be central between the two seat elements 4A and 4B.

However, in an alternative embodiment an offset from the axis of symmetry of the group of seats 2 in relation to the rotation axis 6A can be provided in the y-direction (not shown).

FIG. 3 in a view from above shows the support plate 5 as a component part of the rotating group of seats 2 according to the invention. The support plate 5 serves for fastening the group of seats 2 to the aircraft structure. The rotation axis 6A can be seen, and fastening elements 9 which fix the support plate 5 to the aircraft structure, preferably to seat rails 10 of the passenger aircraft, are shown. Known locking elements, for example, which usually fix components in seat rails of a passenger aircraft can be utilized for a fastening of this type. A locking element of this type is known, for example, from DE 42 12 694 C2.

FIGS. 4A and 4B in a perspective illustration and in a view from above show the passenger seat arrangement 20 according to the invention in the normal position for take-off and landing. This seat arrangement 20 of this type has at least two group of seats 1 and 2 disposed behind one another. A multiplicity of groups of seats are usually disposed behind one another for a cabin layout of a passenger cabin. The seat spacings between the seat rows 1, 2 in the economy class are usually 28 to 32 inches. The region shown in FIG. 4B in the preferred embodiment relates to that region in which the front group of seats 2 is disposed in the region of an aircraft transverse aisle 12. The aircraft transverse aisle 12 is usually aligned in the y-direction of the aircraft, and the at least one aircraft longitudinal aisle 13 is usually aligned in the x-direction of the aircraft. The aircraft seats in the normal position are aligned in the direction of flight. This requirement is to be met by virtue of the safety requirements for the take-off and landing phase. The rear group of seats 1 is configured as a group of three seats. A minimum spacing of at least 28 inches, preferably 29 inches (relating to the seat reference point SRP) between the two seat rows exists for the normal position. The front group of seats 2 is configured as a rotating group of seats, wherein two seat elements 4A, 4B which conjointly result in an approximate width of 90 cm are provided. The width of the seat elements 4 corresponds to the seat widths of economy aircraft seats usually used. The maximum width is limited so as to enable the rotation about the rotation axis 6A in the limited spacing in relation to the rear group of seats 1.

FIGS. 5A, 5B, and 6A, 6B, and 7A, 7B show in each case in a perspective illustration and in a view from above the passenger seat arrangement 20 according to the invention in different intermediate positions. The intermediate positions can be achieved during the flight phase when the rules pertaining to landing and take-off do not have to be applied, so as to implement the seat arrangement shown in FIGS. 8A and 8B, having opposite groups of seats as a final position. The position of the rotating group of seats 2 rotated by 45 degrees as an intermediate position in FIGS. 5A and 5B thus highlights that the support plate 5 as well as the seat elements 4A and 4B require the defined seat spacing from the rear row 1 in order for the entire group of seats 2 to be able to be rotated as an entity about the rotation axis 6A. The position of the rotating element 6 in the region of the front edge of the group of seats 2, and the utilization of the space in the aircraft transverse aisle 12 for the rotation of the group of seats 2, enables the positional modification. The locking elements 9 which connect the support plate to the aircraft structure are released for rotating the group of seats 2.

Furthermore, the passenger seat arrangement 20 according to the invention is shown in each case in a perspective illustration and in a view from above in FIGS. 6A and 6B in a position of the group of seats 2 rotated by 90 degrees. The existing space in the aircraft transverse aisle 12, which has to be free only during take-off and landing and can be utilized otherwise during the flight, is utilized for the intermediate position.

The passenger seat arrangement 20 according to the invention having the rotating group of seats 2 in an intermediate position is likewise shown in each case in a perspective illustration and in a view of above in FIGS. 7A and 7B. The position of the group of seats 2 rotated by 135 degrees can be seen. The existing space in the aircraft transverse aisle 12 which has to be free only during take-off and landing and can be utilized otherwise during the flight is utilized for the intermediate position. It can be seen that the width of the aircraft transverse aisle 12 has likewise to have a minimum width in order for the rotation about the rotation axis 6A to be enabled. At least more than half of the width B of the transverse aisle is utilized as space for the rotation to the intermediate position.

The passenger seat arrangement 20 according to the invention in the rotated final position of the rotating group of seats 2 is shown in each case in a perspective illustration and in a view from above in FIGS. 8A and 8B. The existing space in the aircraft transverse aisle 12 which has to be free only during take-off and landing and can be utilized otherwise during the flight is utilized for this position having opposite groups of seats 1 and 2, the so-called face-to-face position. By way of the rotation about the rotation axis 6A the support plate 5 conjointly with the seat frame 3 and the seat elements 4A and 4B now protrude into the aircraft transverse aisle 12. For this position, the locking elements 9 are again locked in the seat rails. A substantial part of the base area of the rotating group of seats 2, preferably at least half the base area, in this position covers a region of the aircraft transverse aisle 12.

In order for a space-optimized seat arrangement to be achieved, the rear group of seats 1 is to be disposed at a spacing of 53 inches, corresponding to approximately 1346 mm between the seat reference points, to the front group of seats 2. This is an appropriate spacing for specific categories of persons, particularly in the European region. Smaller spacings are conceivable for persons from the Asian region, for example. An arrangement of the two groups of seats 1 and 2 in the face-to-face position can thus be specified as being in a range of at least 45 inches between the seat reference points.

FIG. 9 in a side view shows the passenger seat arrangement 20 in the normal position having groups of seats 1 and 2 aligned in the direction of flight. A preferred seat spacing of 29 inches between the seat rows is implemented here.

FIG. 10 in a side view shows the passenger seat arrangement 20 in a rotated position (face-to-face position) having the rotating group of seats 2 rotated by 180° and aligned so as to be opposite the group of seats 1. Passenger spaces which can be utilized for common activities and enable a certain level of privacy and shielding can thus be achieved for families or groups travelling together, for example. Meetings (in the case of business travelers) or else family zones for families with children are possible, for example. A preferred seat spacing in this configuration is 53 inches between the seat reference points of the two groups of seats 1 and 2.

In addition to the above, it is to be pointed out that "comprising" does not exclude any other elements or steps, and "a" or "one" does not exclude a multiplicity. It is furthermore to be pointed out that features or steps which have been described with reference to one of the above exemplary embodiments can also be used in combination with other features or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 Passenger cabin
20 Passenger seat arrangement
1 Rear group of seats
2 Front group of seats
3 Seat frame
4 Seat elements
5 Support plate
6 Rotating element
7 Receptacle for the rotating element
8 Receptacle bores
9 Fittings
10 Seat rails
11 Front edge of the support plate
12 Aircraft transverse aisle
13 Aircraft longitudinal aisle

The invention claimed is:

1. A group of seats for a passenger aircraft, wherein the group of seats comprises:
a seat frame and at least one seat element;
a support plate for fastening the group of seats to a structure of the aircraft;
a rotating element which rotatably connects the support plate and the aircraft structure, a rotation axis of said rotating element being positioned in a region of a front half of the seat element;
wherein the support plate is configured to be fastened to the aircraft structure by way of quick-release locks,
wherein the support plate is configured to be fixed in seat rails of the passenger aircraft by means of quick-release lock fittings,
wherein the seat rails comprise a pair of spaced parallel rails as part of a passenger aircraft structure separate from the group of seats,
wherein the pair of spaced parallel rails extends along a longitudinal direction of the passenger aircraft and have a length in the longitudinal direction of the passenger aircraft greater than a length of the group of seats in the longitudinal direction of the passenger aircraft,
wherein the support plate has a width greater than a space between the pair of spaced parallel rails and wherein the quick-release fittings are spaced such that a first quick-release lock fitting is aligned with a first rail of the pair of spaced parallel rails and a second quick-release lock fitting is aligned with a second rail of the pair of spaced parallel rails, wherein the first and second quick-release lock fittings are aligned with the first and second rails when the group of seats is in a first position and when the group of seats is rotated 180 degrees to a second position.

2. The group of seats according to claim 1, wherein the seat frame is fixed to the support plate by way of seat fittings.

3. The group of seats according to claim 1, wherein the support plate and the seat frame are an integral component which receives the rotating element.

4. The group of seats according to claim 1, wherein two seat elements are disposed on the seat frame.

5. The group of seats according to claim 1, wherein the rotation axis in the region of a front edge of the seat element is aligned in a longitudinal direction so as to be perpendicular to the front edge.

6. The group of seats according to claim 1, wherein the rotating element is formed having a rotating pin which is disposed on the support plate and which engages in a bearing receptacle on the aircraft structure.

7. A seat arrangement in a passenger cabin of a commercial aircraft, having at least two groups of seats which are disposed behind one another and which are disposed beside an aircraft longitudinal aisle, wherein a front group of seats is disposed in a region of an aircraft transverse aisle, and wherein the front group of seats is configured as a rotating group of seats according to claim 1.

8. The seat arrangement according to claim 7, wherein the rotating group of seats in a take-off and landing state is aligned in a direction of flight, and the groups of seats disposed behind one another have a spacing of 28 to 32 inches from a seat reference point to an identical seat reference point in an adjacent row.

9. The seat arrangement according to claim 7, wherein the rotating group of seats in a flying state is aligned in a rotated position counter to a direction of flight and rotated by 180° in a face-to-face position with a rear group of seats, wherein the rear group of seats is disposed at a spacing of at least 45 inches between a seat reference point of the rear group of seats and an identical seat reference point of the front group of seats.

10. The group of seats according to claim 1 wherein the support plate lies in face-to-face relationship with a floor of the aircraft structure such that a stowage space is formed by the seat frame between a bottom of the at least one element and the support plate and the stowage space is rotational with rotation of the group of seats.

11. A group of seats for a passenger aircraft, wherein the group of seats comprises:
a seat frame and at least one seat element;
a support plate for fastening the group of seats to a structure of the aircraft, the seat frame supporting the at least one seat above the support plate such that a standard aircraft stowage space for carry-on baggage is formed between the support plate and a bottom of the at least one seat element;
a rotating element which rotatably connects the support plate and the aircraft structure, a rotation axis of said rotating element being positioned in a region of a front half of the seat element;
wherein the support plate is configured to be fastened to the aircraft structure by way of quick-release locks,
wherein the support plate is configured to be fixed in seat rails of the passenger aircraft by means of quick-release lock fittings,
wherein the seat rails comprise a pair of spaced parallel rails as part of a passenger aircraft structure separate from the group of seats, wherein the support plate has a width greater than a space between the pair of spaced parallel rails and wherein the quick-release fittings are spaced such that a first quick-release lock fitting is aligned with a first rail of the pair of spaced parallel rails and a second quick-release lock fitting is aligned with a second rail of the pair of spaced parallel rails, wherein the first and second quick-release lock fittings are aligned with the first and second rails when the group of seats is in a first position and when the group of seats is rotated 180 degrees to a second position, wherein the standard aircraft stowage space for carry-on baggage rotates upon rotation of the group of seats.

* * * * *